United States Patent [19]

Johner

[11] Patent Number: 4,924,058

[45] Date of Patent: May 8, 1990

[54] POWDER RECHARGING APPARATUS, ESPECIALLY FOR A COATING APPARATUS OPERATING IN A VACUUM CHAMBER

[75] Inventor: Gerhard Johner, Gelnhausen, Fed. Rep. of Germany

[73] Assignee: Leybold Aktiengesellschaft, Hanau, Fed. Rep. of Germany

[21] Appl. No.: 277,135

[22] Filed: Nov. 29, 1988

[30] Foreign Application Priority Data

Oct. 12, 1988 [DE] Fed. Rep. of Germany ....... 3834740

[51] Int. Cl.[5] ................................................ B23K 9/00

[52] U.S. Cl. ............................ 219/121.47; 219/76.16; 219/121.48; 239/85; 222/152; 222/399

[58] Field of Search ...................... 219/121.47, 121.48, 219/76.16, 121.36, 76.14, 76.15; 239/79, 80–85; 406/613; 222/204, 152, 416, 630, 631, 399

[56] References Cited

U.S. PATENT DOCUMENTS

| | | | |
|---|---|---|---|
| 3,807,602 | 4/1974 | Meichsner | 222/630 |
| 4,279,383 | 7/1981 | Zverev et al. | 239/85 |
| 4,678,120 | 7/1987 | Matsuo | 239/85 |
| 4,835,022 | 5/1989 | Huhne | 239/80 |

*Primary Examiner*—M. H. Paschall
*Attorney, Agent, or Firm*—Felfe & Lynch

[57] ABSTRACT

In a powder recharging apparatus for a low-pressure plasma spraying system having a powder magazine with a fill pipe (22) at its bottom and a powder feeder (32) cooperating with the magazine (23) and connected by a hose or pipe to the vacuum chamber, a valve pair (19, 20) is inserted into the fill pipe (22) and is connected by a tee coupling (21) both to a valved vacuum pipe (25) and to an additional connecting pipe or flange (30), this flange (30) being joined by a releasable pipe coupling, such as a pipe union (18) for example, to the flange (29) of a funnel neck (10) of a supply funnel (9), a second valve pair (15, 16) being inserted between this flange (29) and the outlet connection (10). To refill it with powder, the upper assembly (A) of the system can be separated from the lower assembly (B) and then can be filled in a chamber flooded with noble gas after opening the valve pair (15, 16), and then, after it is reconnected to the assembly (B) with the valves closed, it is again in a position permitting the transfer of the powder from the supply funnel (9) into the supply magazine (23) of the powder feeder (32).

14 Claims, 1 Drawing Sheet

POWDER RECHARGING APPARATUS, ESPECIALLY FOR A COATING APPARATUS OPERATING IN A VACUUM CHAMBER

BACKGROUND OF THE INVENTION

The invention relates to a powder recharging apparatus, especially for a coating system operating in a vacuum chamber, such as, for example, a system for low-pressure plasma spraying, having a powder magazine terminated by a fill tube and a powder feeder cooperating with the magazine and connected by a pipe or flexible tube to the vacuum chamber.

It is known to provide machine parts or engine parts with coatings of elements having a high oxygen gas affinity, by means of low-pressure plasma spraying systems. But to assure extreme purity of the coatings it is necessary to pour the coating powder needed for the coating process into the powder magazine with the exclusion of air. Experience has shown that this presents great problems, especially since certain spray powders burst into flame upon exposure even to small amounts of air.

SUMMARY OF THE INVENTION

It is the purpose of the invention to create an apparatus which will permit the reloading of powder magazines from cans with the exclusion of air, without the need to interrupt an ongoing coating process, and without producing pressure fluctuations in the coating system.

This purpose is accomplished in accordance with the invention by inserting a valve pair into the fill tube corresponding to the powder magazine and connecting it through a tee coupling both to a valved vacuum pipe and to an additional pipe connection or flange, this flange being connectable by a pipe coupling, such as a union, to the flange of the neck of a supply funnel, an additional valve pair being inserted between this flange and the funnel neck.

The powder magazine, the pipe connection corresponding thereto, the two pairs of valves, the tee coupling, the flanges, the pipe union and the neck of the supply funnel are for this purpose arranged perpendicularly such that their passage bores are aligned with one another and form a passage through which the powder can run from the supply funnel into the powder magazine.

Preferably, the valves of the two valve pairs are ball valves, so that, when the valves are opened, the powder can easily pass through them and out of the supply funnel.

Advantageously, a top support plate disposed in a horizontal plane in a supporting frame holding the supply funnel is provided with a cut-out or opening, and the supply funnel has a collar supporting it at least partially on the marginal portion of the opening, while the support plate is equipped with a slot extending outwardly from the opening and having such a width that the supply funnel can be removed sideways through the slot.

This opening, with the laterally running slot, has the advantage that an upper assembly of the apparatus can conveniently be removed from the supporting frame in order to refill the supply funnel with the powder from a powder can after this assembly has been rotated.

The top support plate is best mounted on legs and holds the supply funnel at distance from the powder feeder permitting a perpendicular arrangement of all the assemblies connecting the supply funnel to the powder magazine.

Preferably a bellows is inserted between the two pairs of valves to permit compensation for differences in the length of the parts of the assemblies that are aligned perpendicularly with respect to the distance separating the two plates of the supporting frame.

Between the two pairs of valves there is disposed a tee coupling which permits the powder to pass from the supply funnel to the powder magazine or connects this passageway to a vacuum source through a vacuum line and an additional valve.

DETAILED DESCRIPTION OF THE PREFERRED EMBODIMENT

Figure 1:
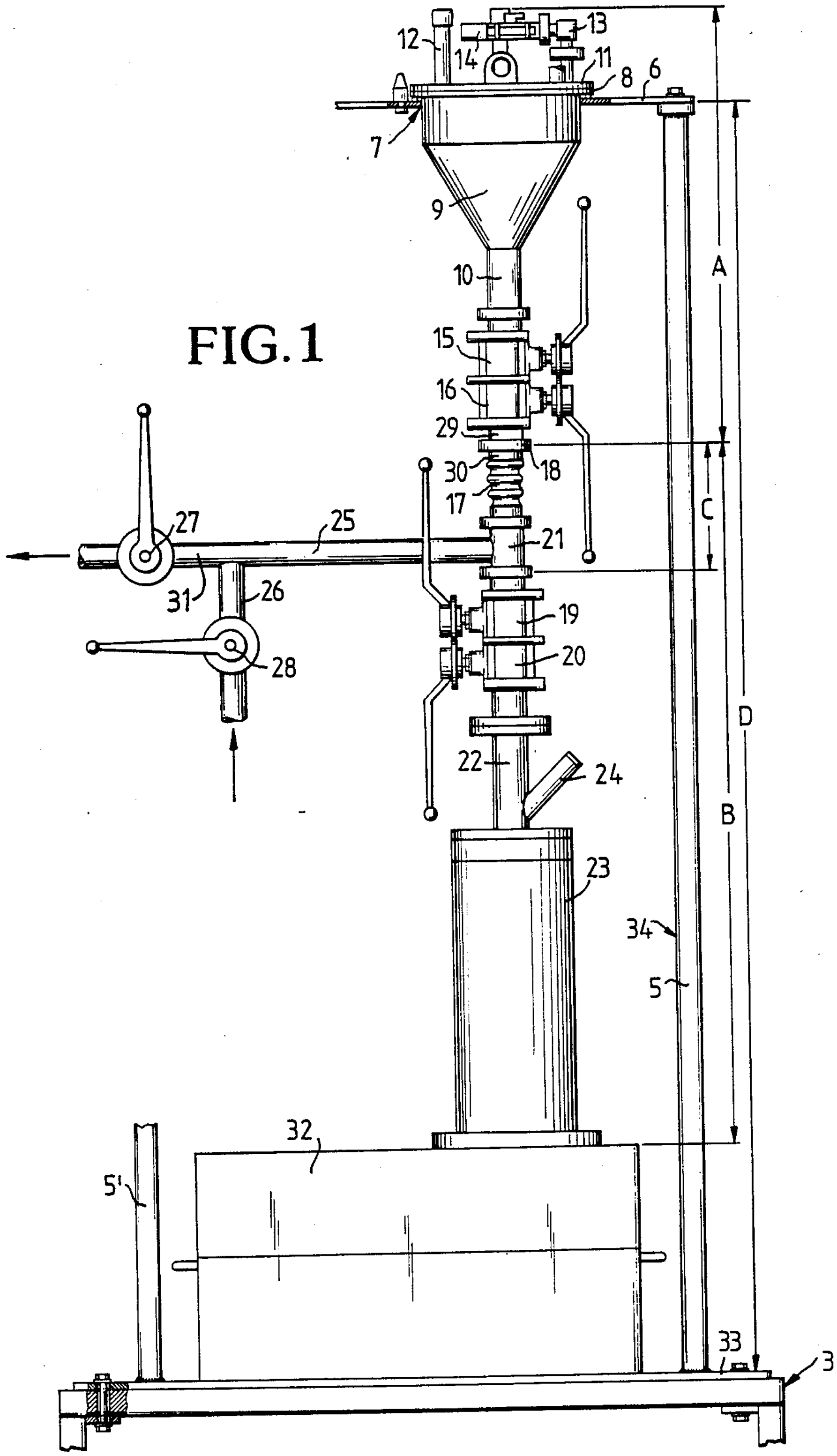
FIG. 1 is a side view of the apparatus in accordance with the invention, some parts of the supporting frame having been omitted to provide a clearer view.

The apparatus for admitting powder into the chambers that are under vacuum, in a plasma spraying system for example, consists essentially of a bottom support plate 33 bolted to a table-like frame 3, several perpendicular legs 5, 5', ..., welded to the bottom support plate 33, a top support plate 6 which is provided with a U-shaped cutout or opening 7 and is bolted to the legs 5, 5', ..., a supply funnel 9 supported by a collar 8 on the top support plate 6, having a funnel neck 10 and a cover 11, and provided with adjusting legs 12, a pressure valve 13 and a vacuum connection 14, a double ball valve 16, 16', affixed to the funnel neck 10, a clamping ring coupling 18 connecting a bellows 17 to the ball valve 16, a tee coupling 21 connected to a second double ball valve 19, 20, with a connection 25, a bottom fill pipe 22, and the powder magazine 23.

The vacuum tube 25 which connects the apparatus selectively via branch 31 to the vacuum pump (not shown) or via the branch 26 to a noble gas source (not shown) is connected to the tee coupling 21. Valves 27 and 28 are inserted into the vacuum line 25 and into the branch 26.

If powder is to be loaded into the powder magazine 23 connected to the powder coating system, and this loading is to be performed with the exclusion of air (since the powder being loaded burns in air), in a *first step* the valve 27 and the two double ball valves 19, 20, and 15, 16, respectively, are closed, so that the evacuated powder magazine 23 and the supply funnel 9 as well as the two connections 10 and 22 remain evacuated.

In a *second step*, the pipe union 18 is unfastened to release the upper assembly A of the apparatus from the lower assembly B.

In a *third step*, assembly A is removed laterally out of the opening 7 in the top support plate 6 and rotated 180 degrees, so that this assembly A can be set down with its legs 12 on a base plate, while the open flange 29 permits access through the double ball valve 15, 16, to the supply funnel 9.

In a *fourth step*, a container is inverted over the set-aside assembly A and then is filled with a noble gas, so that after the double ball valve 15, 16, is opened, the powder can be taken from a waiting can and poured into the supply funnel 9 through the flange 29, the double ball valve 15, 16, and the funnel neck 10.

In a *fifth step*, the double ball valve 15, 16, is closed, the container filled with noble gas is removed, assembly A is turned 180 degrees and returned to the position represented in the drawing, and the flange 29, 30, is again tightly connected by the pipe union 18.

In a *sixth step*, portion C situated between the two valve pairs or ball valve groups 15, 16, and 19, 20, and the vacuum line 25 with the branch lines 26, 31, is connected either to the vacuum source by opening valve 27, or to a noble gas source by opening valve 28, so that in this portion C either the same pressure prevails as in the powder magazine 23, or the same noble gas atomsphere prevails as in the supply funnel 9.

In a *seventh step* the two pairs of ball valves 15, 16, and 19, 20, can be opened so that powder will run from the supply funnel 9 into the powder magazine 23, and from there the powder can be transported into the coating system.

It is clear that the powder magazine 23 can also be connected to an apparatus in which the powder is continuously produced and from which it is fed in a vacuum or in a noble gas atmosphere into the powder magazine 23.

The apparatus described offers the advantage that in the case of powder producing apparatus that is not connected to the coating system, or in the case of a powder coating process of undefined duration, a continuous delivery of powder through the powder feeder 32 to the coating chamber or vacuum chamber can be assured.

I claim:

1. Powder recharging apparatus comprising
 a supply funnel having a neck,
 a powder feeder below said supply funnel, said feeder receiving powder along a powder path from said supply funnel,
 a tee between said neck and said powder feeder, said tee being aligned to pass powder downward therethrough, said tee being connected laterally to a valved vacuum pipe out of the path of said powder,
 first valve means connected serially between said neck and said tee,
 second valve means connected serially between said tee and said powder magazine,
 a fill tube connected to said second valve means between said second valve means and said powder feeder, and
 a powder magazine connected between said fill tube and said powder feeder.

2. Apparatus as in claim 1 further comprising a frame for supporting said supply funnel, said frame comprising a top plate having a cut-out, said funnel having a collar for supporting it on the margin of the cut-out, said cut-out being open so that the funnel can be removed sideways from the plate.

3. Apparatus as in claim 2 wherein said frame has legs which support said top plate so that the first and second valve means and the tee may be arranged vertically between the top plate and the powder magazine.

4. Apparatus as in claim 1 further comprising a bellows between the first and second valve means, which permits equalizing the distance between the funnel and the magazine and the parts inserted therebetween.

5. Apparatus as in claim 1 wherein the vacuum pipe is connected through an additional valve to a noble gas source.

6. Apparatus as in claim 1 wherein further comprising a cover closing the top of the supply funnel, said cover having legs thereon which permit the funnel to be stood in an inverted position.

7. Apparatus as in claim 1 wherein said first valve means comprises a pair of valves.

8. Apparatus as in cliam 7 wherein said valves are ball valves.

9. Apparatus as in claim 1 wherein said second valve means comprises a pair of valves.

10. Apparatus as in claim 9 wherein said valves are ball valves.

11. Powder recharging apparatus for supplying powder along a downward powder path to a powder feeder, said apparatus comprising
 an upper assembly comprising a supply funnel having a neck, and first valve means serially connected to said neck,
 a lower assembly comprising a tee aligned to pass powder along said path, a valved vacuum pipe connected laterally to said tee out of said path, second valve means serially connected to said tee, a fill tube serially connected to said second valve means, and a powder magazine serially connected to said fill tube, and
 means for detachably connecting the upper assembly to the lower assembly.

12. Powder recharging apparatus as in claim 11 wherein said means for detachably connecting the upper assembly to the lower assembly comprises a flange on the bottom of the upper assembly, a flange or the top of the lower assembly, and a pipe coupling joining said flanges.

13. Apparatus as in claim 11 wherein said first valve means comprises a pair of valves.

14. Apparatus as in claim 11 wherein said second valve means comprises a pair of valves.

* * * * *